(12) United States Patent
Jiang et al.

(10) Patent No.: US 11,879,826 B2
(45) Date of Patent: Jan. 23, 2024

(54) FLOW CYTOMETER COMMUNICATION SYSTEM FOR SMART FLOW CYTOMETERS WITH SELF MONITORING

(71) Applicant: Cytek Biosciences, Inc., Fremont, CA (US)

(72) Inventors: Janine Jiang, Danville, CA (US); David Vrane, San Jose, CA (US)

(73) Assignee: Cytek Biosciences, Inc., Fremont, CA (US)

( * ) Notice: Subject to any disclaimer, the term of this patent is extended or adjusted under 35 U.S.C. 154(b) by 0 days.

(21) Appl. No.: 17/412,695

(22) Filed: Aug. 26, 2021

(65) Prior Publication Data

US 2021/0389226 A1    Dec. 16, 2021

Related U.S. Application Data

(63) Continuation of application No. 16/101,385, filed on Aug. 10, 2018, now Pat. No. 11,131,618.

(51) Int. Cl.
*G01N 15/00*   (2006.01)
*G01N 15/14*   (2006.01)

(52) U.S. Cl.
CPC ..... *G01N 15/1431* (2013.01); *G01N 15/1425* (2013.01); *G01N 15/1434* (2013.01); *G01N 2015/1438* (2013.01)

(58) Field of Classification Search
CPC .......... G01N 15/1431; G01N 15/1425; G01N 15/1434; G01N 2015/1438
USPC .......... 250/428, 432 R, 435, 458.1; 702/104, 702/116, 183, 184
See application file for complete search history.

(56) References Cited

U.S. PATENT DOCUMENTS

| | | | |
|---|---|---|---|
| 6,941,077 B2* | 9/2005 | Aronson | G01M 11/00 398/137 |
| 7,146,292 B2* | 12/2006 | Rossi | G01R 31/2846 702/183 |
| 10,436,697 B2* | 10/2019 | Vrane | G01N 15/1404 |
| 2009/0216494 A1* | 8/2009 | Stadler | H04L 43/50 372/38.1 |
| 2010/0256943 A1* | 10/2010 | Donnenberg | G01N 15/1425 250/252.1 |
| 2013/0080082 A1* | 3/2013 | Howes | G01N 15/14 702/100 |
| 2015/0140577 A1* | 5/2015 | Li | G01N 21/645 250/226 |
| 2016/0011094 A1* | 1/2016 | Kennington | G01N 15/1404 134/22.12 |
| 2018/0364144 A1* | 12/2018 | Kennington | G01N 15/1012 |

* cited by examiner

*Primary Examiner* — Michael Maskell
(74) *Attorney, Agent, or Firm* — Alford Law Group, Inc.

(57) ABSTRACT

In some embodiments, a plurality of smart flow cytometers are coupled into communication with a computer communication network. A central repair server system is coupled into communication with the computer communication network and the plurality of smart flow cytometers. Each of the plurality of smart flow cytometers includes a monitoring system coupled to monitor differing operational parameters of the smart flow cytometer for possible failure. The monitoring system can detect an advanced failure of components based on the operational parameters being monitored. The monitoring system can also detect an advanced need for repair and maintenance based on the operational parameters being monitored.

11 Claims, 8 Drawing Sheets

(Background)

(Background)

FLOW CYTOMETER COMMUNICATION SYSTEM FOR SMART FLOW CYTOMETERS WITH SELF MONITORING

CROSS REFERENCE TO RELATED APPLICATION

This patent application is a continuation claiming priority to United States (US) Patent application Ser. No. 16/101,385 titled SMART FLOW CYTOMETERS WITH SELF MONITORING AND SELF VALIDATION filed on Aug. 10, 2018 by inventors Janine Jiang et al. incorporated herein by reference for all intents and purposes.

FIELD

The embodiments of the invention relate generally to flow cytometers.

BACKGROUND

A flow cytometer is a machine that is used to analyze the physical and chemical characteristics of particles in a flow of a sample fluid as its passes through a laser light generated by a laser of a flow cytometer. Cell components in the sample fluid can be fluorescently labeled and then excited by the laser so they emit light at varying wavelengths.

The fluorescence can be measured to determine various properties of single particles, which are usually biological cells (e.g., blood cells). Up to thousands of particles per second can be analyzed as they pass by the laser in a liquid stream. Examples of the properties measured include the particle's relative granularity, size and fluorescence intensity as well as its internal complexity. An optical-to-electronic coupling system of a flow cytometer is used to record the way in which the particle emits fluorescence and scatters the incident beam from the laser.

The optical system of a flow cytometer includes a laser which illuminates the particles present in the stream of sample fluid. As the particles pass through the incident laser light from the laser, the laser light scatters. Furthermore, when excited by the laser light, any fluorescent molecules that are on the particle emit fluorescence which can be detected by carefully positioned lenses and detectors. A flow cytometer collects data about each particle or event. The characteristics of those events or particles are determined based on their fluorescent and light scattering properties.

The electronics system of a flow cytometer is used to receive reflected and/or scattered light signals with one or more detectors and convert them into electronic pulses that represent data over time that a computer can process. The data can then be analyzed with the computer to ascertain information about a large number of biological cells over a short period of time.

A flow cytometer is a complex piece of laboratory equipment with complicated systems that requires all systems and elements to be properly functioning in order to accurately analyze a sample of cells. If an optical element (e.g., lens) in the flow cytometer becomes misaligned, the collected data may not be accurate, such as from a poor signal to noise ratio. If a laser device fails or a detector device fails, a limited amount of data or none whatsoever may be collected. There may be no advance warning of such failures of a flow cytometer to the user, such that the flow cytometer cannot function properly until it undergoes repairs and one or more parts are replaced.

A user may have basic maintenance knowledge of a flow cytometer, such as to fill fluid tanks and empty waste tanks. However, repairing a flow cytometer (e.g., replacing a laser or a detector) is usually not something the ordinary user can perform. The repairs are usually performed by the manufacturer employees or a well trained technician of a service provider, and not the user. The manufacture is usually contacted to schedule repairs and order replacement parts if any. Replacement parts, if needed, can take some time to acquire. A flow cytometer may be down for days before it is returned to a fully functional state. Periodic maintenance may be performed to avoid some failures, but there are no guarantees that a failure would not occur between scheduled maintenance periods. It is desirable to improve a flow cytometer to facilitate better repair and maintenance service and avoid down time.

BRIEF SUMMARY

The embodiments of the invention are summarized by the claims that follow below.

BRIEF DESCRIPTIONS OF THE DRAWINGS

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

The embodiments disclosed herein includes methods, apparatus and systems for smart or intelligent flow cytometers.

INTRODUCTION

Figure 1A:
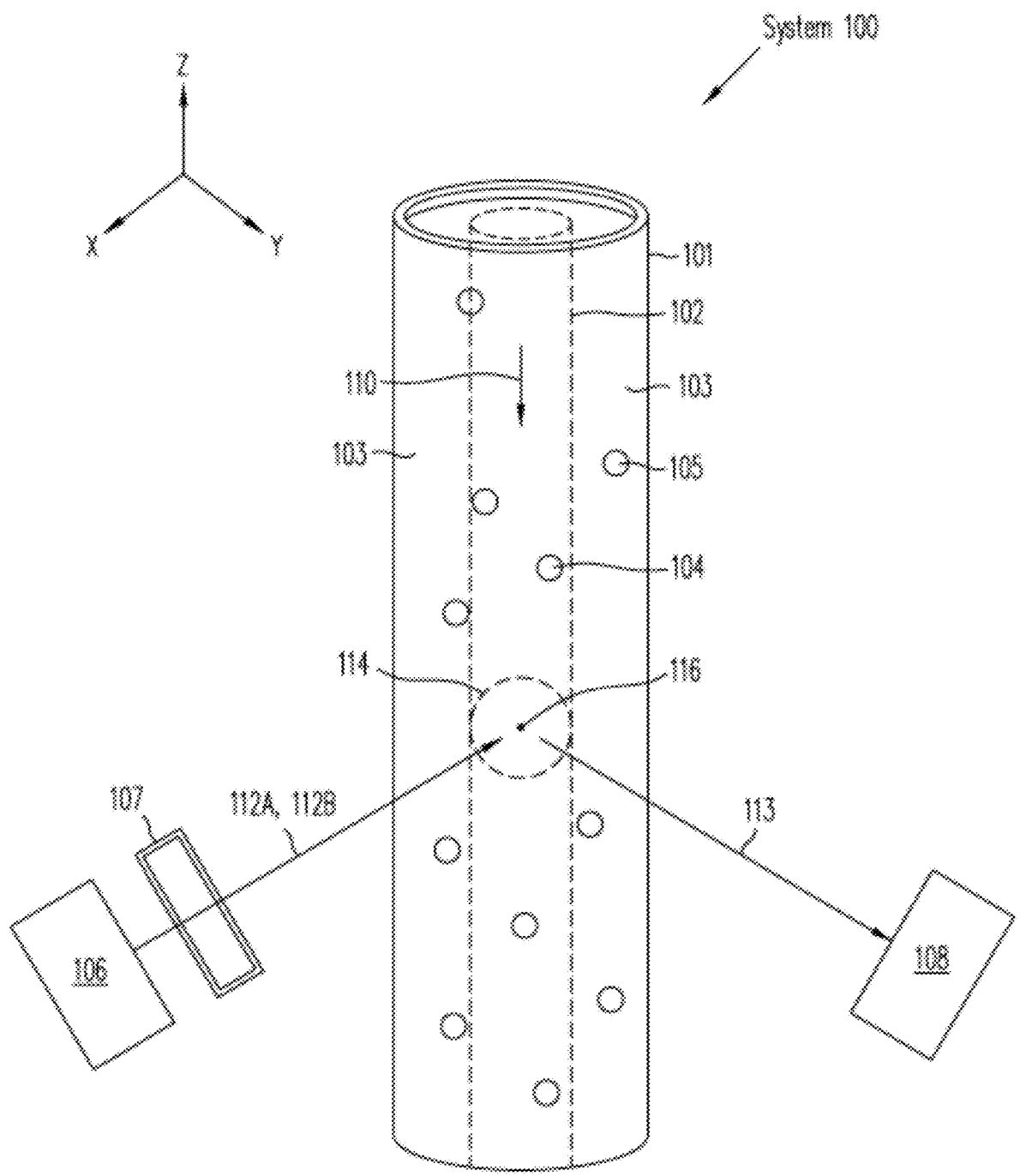
FIG. 1A is a background diagram of a flow cytometry system.

A flow cytometer can be used to perform live bio-cell analysis. FIG. 1A is a schematic diagram of a portion of an exemplary flow cytometry system 100 with one or more laser beams 112A and 112B. The flow cytometry system 100 is a particle analyzer that includes a hollow cylindrical flow tube 101, a laser device 106, optical elements 107, and one or more detector devices 108, among other devices. The laser device 106 is a light source that is coupled into optical elements 107. With a single laser beam from the laser device 106, optical elements 107 can form one or more laser beams 112A and 112B that are directed at the flow tube 101. Alternatively, a plurality of laser devices 106 can be used to form a plurality of laser beams 112A-112B. The plurality of laser devices may operate at different frequencies to excite different wavelengths of fluorescent dyes. The one or more detector devices 108 includes optics and sensors for detecting reflected or scattered light 113 at various angles.

A sample fluid flow 102 in the center of the flow tube 101 is surrounded by a background fluid flow (sheath fluid) 103. The sample fluid flow 102 and the background fluid flow 103 flow together in a flow direction 110 through the flow tube 101. The sample fluid 102 may include, for example, particles 104 (e.g., blood cells, blood cell fragments, etc.) in an aqueous solution (e.g., plasma) that is desirous to be analyzed. The background fluid flow 103 surrounding the sample fluid flow 102 may be water and/or some other inert fluid. Occasionally, unwanted contaminant particles 105 may be found in the background fluid flow 103.

The one or more laser beams 112A and 112B are focused on illuminating the particles 104 in the sample fluid flow 102 as they flow by in the flow tube 101. The one or more laser beams 112A and 112B illuminate the sample fluid 102 in a sample region 114 (e.g., laser beam spot), including an interrogation spot 116. In design, the illuminated sample region 114 emits reflected and/or scattered light 113 from the interrogation spot 116 towards the one or more detector devices 108. Using the reflected and/or scattered light 113, the detector device 108 generates a signal that can be analyzed to determine the physical and/or chemical characteristics of the particles 104 as the sample fluid 102 with the particles passes through the sample region 114. Noise is generated when the detector generates a signal from detecting anything else other than the particles 104 in the sample fluid 102. For example, if unwanted contaminant particles 105 found in the background fluid flow 103 are illuminated and detected; the detector generates noise in the signal.

Thus, it is desirable to illuminate the sample fluid flow 102 in the sample region 114 without illuminating other regions in the background fluid flow 103. Furthermore, it is desirable to illuminate the sample region 114 uniformly in the direction perpendicular to the sample flow direction 110 to minimize particle-to-particle signal variations caused by slightly different trajectories through the illumination region. Accordingly, the dual laser beams 112A and 112B, and the flow direction 110 are substantially perpendicular (e.g., ninety (90) degrees plus or minus five (5) degrees) to each other. Some of the light may be reflected and or scattered light may be reflected or scattered substantially perpendicular (ninety (90) degrees plus or minus (+/−) five (5) degrees) to the dual laser beams 112A. For example, assume the system 100 is situated in a three-dimensional (xyz) Cartesian coordinate system. The one or more laser beams 112A and 112B may be directed along the x-axis; the reflected or scattered light 113 may be directed along the y-axis; and the flow direction 110 may be along the z-axis. The light may be reflected or scattered at other angles and detected by one or more detectors positioned along the optical axis of the reflected or scattered light angles.

Figure 1B:
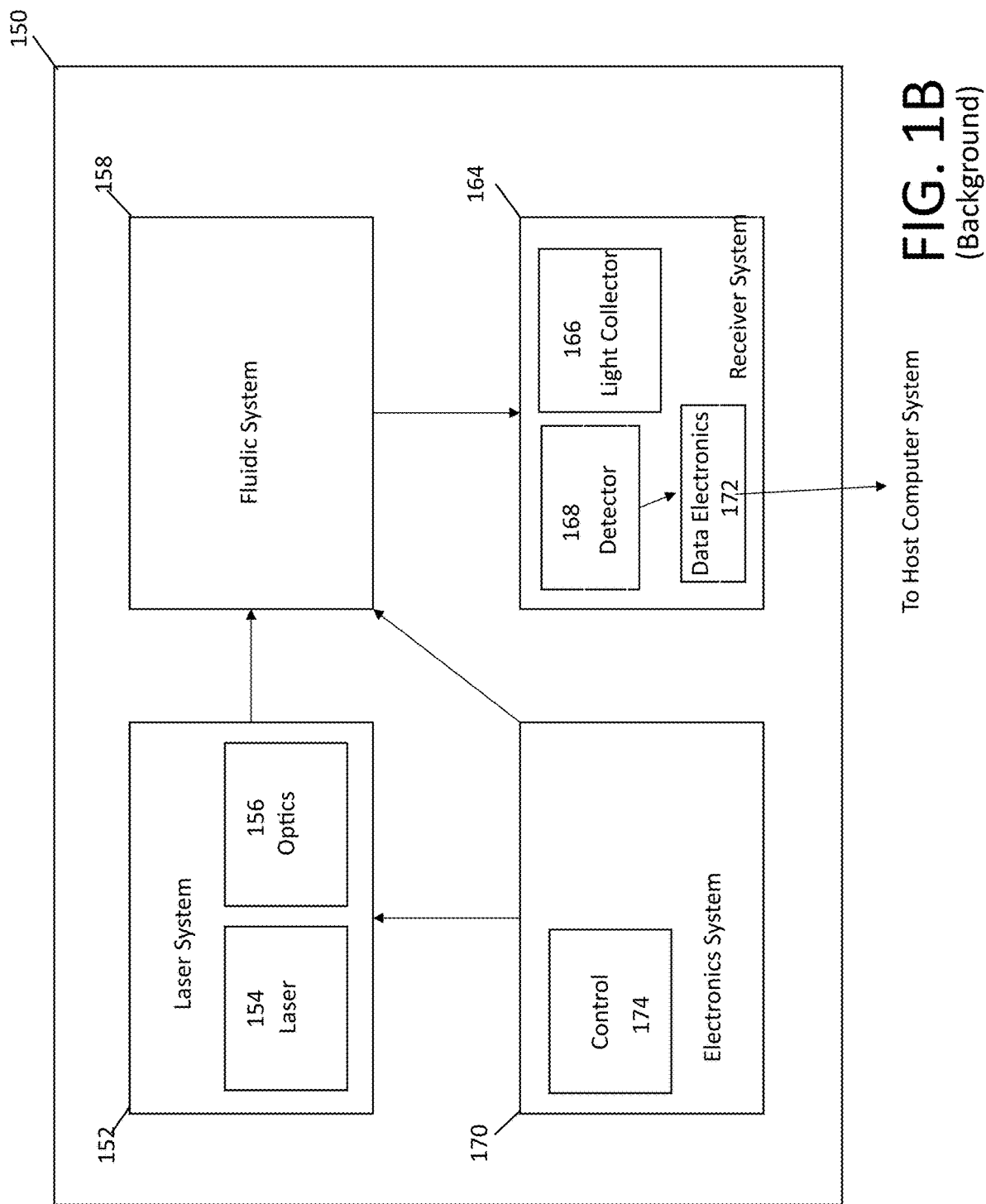
FIG. 1B is a background functional block diagram of a flow cytometer.

Referring now to FIG. 1B, a functional block diagram of a flow cytometer 150 is shown. Further details of flow cytometers or portions thereof are described in U.S. patent application Ser. No. 15/498,397, titled COMPACT MULTI-COLOR FLOW CYTOMETER, filed by David Vrane et al on Apr. 26, 2017; Ser. No. 15/817,237, titled FLOW CYTOMETRY SYSTEM WITH FLUIDICS CONTROL SYSTEM filed by David Vrane et al on Nov. 19, 2017; Ser. No. 15/659,610, titled COMPACT DETECTION MODULE FOR FLOW CYTOMETERS, filed on Jul. 25, 2017 by Ming Yan et al.; no. 62/674,273, titled FAST RECOMPENSATION OF FLOW CYTOMETERY DATA FOR SPILLOVER READJUSTMENTS filed on May 21, 2018 by Zhenyu Zhang; all of which are incorporated herein by reference for all intents and purposes.

The flow cytometer 150 includes an excitation laser system 152, fluidic system 158, receiver system 164 and electronic system 170. Laser system 152 can include one or more lasers 154 of different wavelengths (such as 355 nanometers (nm), 375 nm, 405 nm, 488 nm, 638 nm or any other wavelength) that can be used to excite dyes used to label the bio cells for generating fluorescence. The dyes marking different biological cells can be excited at different wavelengths and fluoresce at different wavelengths. The fluorescence at the different wavelengths can be captured to identify the different biological cells in a biological sample. Other types of samples with different types of particles can be similarly marked with different dyes with differing wavelengths to analyze their make up of different particles, such as chemicals for example.

Optics 156 is used to shape and collimate the lasers 154 to focus onto the fluidic system 108, where dye labeled bio cells are linearly queued and pass through the laser beams one by one for the attached dyes to absorb the excitation laser power and emit fluorescence. The fluorescence light is collected by the light collector 166 of the receiver system 164 and directs the collected fluorescence light to the detector 168. The light collector 166 can be a lens, fiber, or a combination of lens and fiber. The detector 168 can be multiple of photo multipliers (PMT) or a PMT array, or multiple avalanche photo diodes (APD) or an APD array.

When the dye labeled biological cells pass through the incident laser beams 154 focused by the optics 156, the biological cells can fluoresce if excited with the right wavelength but will also scatter the incident laser beams forward as forward scattering light, sideways as side scattered light, or backwards as back scattered light. Photodiodes or detectors 168, and one or more arrays of a plurality of photodiodes or detectors 168 can be placed at different locations to collect the forward scattered light, the side scattered light, and/or the back scattered light to study the bio cell sizes and cell physical structure details. Arrays of a plurality of photodiodes or detectors 168 are desirable to capture the various different wavelengths of fluorescence expected from the activation of the various dyes marking cells and particles.

The electronics system 170 in the flow cytometer 150 includes control electronics 174 to operate the fluidic system 158, lasers 154, detectors 168, and data electronics 172. Under control of the electronics system 170, the data electronics amplifies the luminescence data received by the detector 168 and the scattering light data by the scattering light detector 168. The received analog luminescence and light data is digitized by an analog to digital converter (ADC) (e.g., See ADC 219 in FIG. 2) into digital form. The digital data is processed according to an algorithm in a floating point gate array (FPGA) by the data electronics 172 to remove noise and output into a host computer system. The processed data is finally acquired by an external host computer system for further post acquisition analysis. Note that the typical flow cytometer 150 does not store data results associated with the operation of the flow cytometer. The data results are stored externally by a host computer coupled to the flow cytometer.

Prior to normal operation in the testing of cells, a user will turn on the flow cytometer 150 and wait for its systems to warm up, which can be roughly from 20 to 60 minutes. Before any actual sample of biological cells is run through the flow cytometer 150, a qualification/calibration test of the flow cytometer 150 can be manually run by the user using qualification/validation beads. The qualification/calibration test determines the overall system status before starting to use the flow cytometer and its systems to run regular tests. While qualification tests will provide an indication of the flow cytometer system's operational condition, the qualification/calibration tests do not provide any information when a system or component of the system may fail in the flow cytometer 150.

Failure of a flow cytometer can be problematic when biological cells have a limited life time. For example, assume an important blood sample test is beginning to run through the flow cytometer 150 and the system starts to malfunction in the middle of the run. Blood samples can have limited life times. Moreover, there may be only one sample of cells from a patient and time is of essence in obtaining a diagnosis within a couple of hours. It may take more than 24 hours for a service engineer to be called for a repair service, show up, diagnose and repair a failing flow cytometer. If parts need replacement, it may take additional time to order the proper part and install it.

It is therefore useful if a flow cytometer can be constantly monitored on site for failures, even while samples are not run. Moreover, it would be useful to provide remote monitoring and diagnosis. Before a user experiences a failure, a service technician can logon remotely to the flow cytometer and remotely diagnose operational issues. A service technician could be automatically notified for a repair service (in contrast to a regular scheduled maintenance) and sent to the site to repair the flow cytometer, thereby reducing the instrument down-time. With repair services performed early in advance of failure, the chances of a blood sample being ruined due to possible instrument malfunction is reduced. In some cases, the ruination of a blood sample can be life threatening to the patient without the immediate diagnosis.

Smart Flow Cytometer

Figure 2:
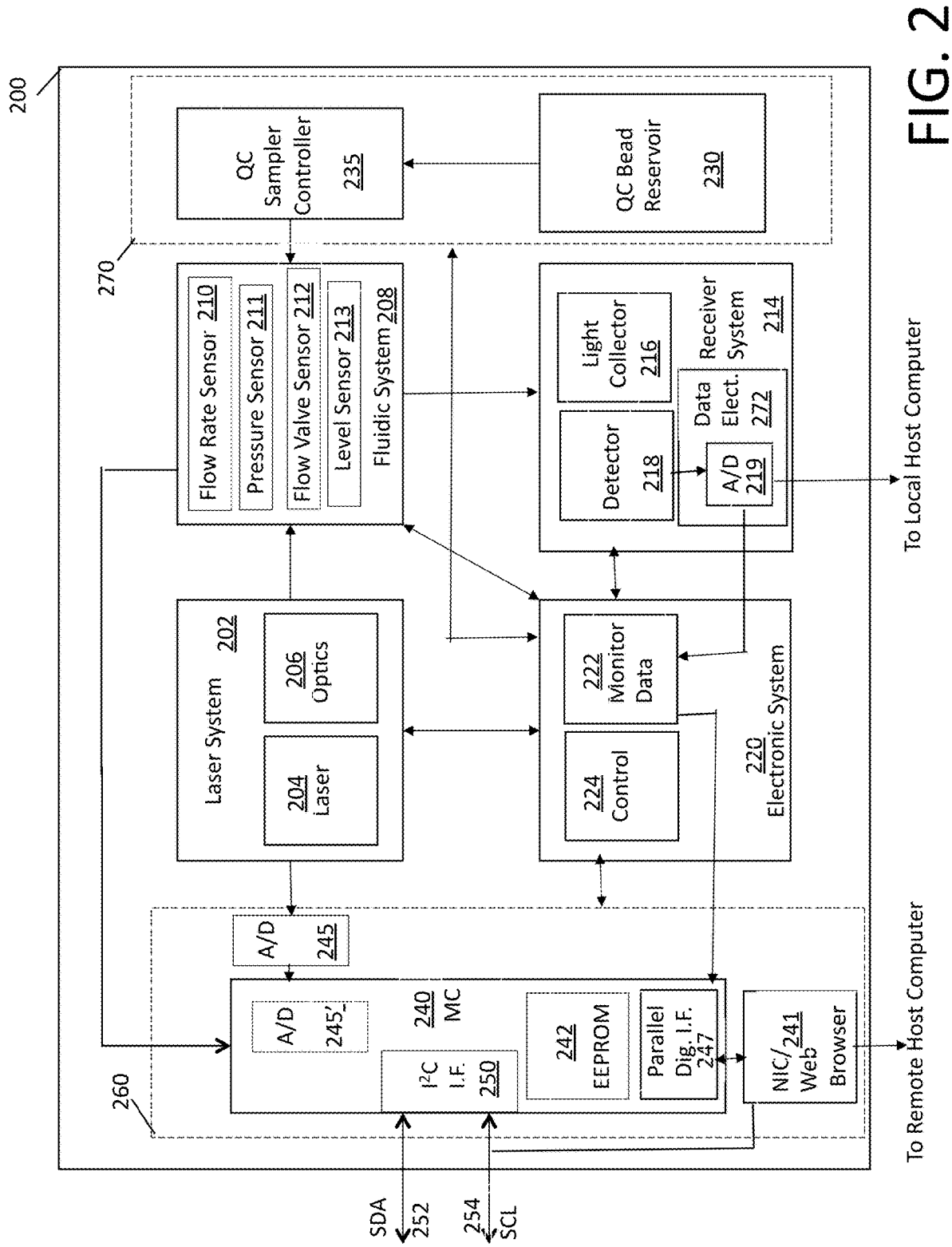
FIG. 2 is a functional block diagram of a smart or intelligent flow cytometer.

Referring now to FIG. 2, a functional block diagram of a smart or intelligent flow cytometer 200 is shown. The smart flow cytometer 200 includes a laser system 202, a fluidic system 208, a receiver system 214, and an electronics system 220. The electronics system 220 is coupled in communication to each of these systems to control their operations. Each of these systems function similar to the systems described with reference to the flow cytometer 150 shown in FIG. 1B. For example, an array of detectors 118,218 may include a serial chain of micro-mirrors on one side and a serial chain of dichroic filters on the opposing side in the detector channels with the photodetectors, as disclosed in U.S. patent application Ser. No. 15/659,610 titled COMPACT DETECTION MODULE FOR FLOW CYTOMETERS, filed on Jul. 25, 2017, by Ming Yan et al., incorporated by reference. Accordingly, the remarks regarding the similar systems of the laser system 152, the fluidic system 158, the receiver system 164, and the electronics system 170 in the flow cytometer 150 are incorporated here by reference and respectfully applicable to the laser system 202, the fluidic system 208, the receiver system 214, and the electronics system 220 of the smart flow cytometer 200.

However, the smart flow cytometer 200 further includes a monitoring system 260 and a quality control system 270 over the typical systems found in a flow cytometer, such as the flow cytometer 150. The electronics system 220 is coupled to both the monitoring system 260 and the quality control system 270 to control the operation thereof. The monitoring system 260 is coupled in communication will all of the systems of the smart flow cytometer to monitor their operation and remotely control them when needed to perform a remote diagnosis. The components of the systems in the smart flow cytometer support the monitoring system. For example, the one or more lasers 204 in the laser system 202 can be COHERENT OBIS 405LX, 488LX, 640LX, or other equivalent laser modules for example.

The quality control system 270 of the smart flow cytometer 200 facilitates a start up validation with quality control beads prior to running a sample of cells through the smart flow cytometer. The validation of data output facilitated by the quality control system 270 can be monitored by the monitoring system 260 to also provide a measure of performance monitoring.

Generally, the monitoring system 260 includes a microcontroller 240 with an internal memory, external memory, or other storage device to provide a periodic constant monitoring process to determine in advance when repair service is needed for failing components, such as a failing laser and/or a failing detector. The microcontroller 240 is coupled in communication with each of the one or more lasers 204, the one or more light detectors 216, and the one or more sensors 210-213 (e.g., a flow rate sensor 210) in the fluidic system 208 to determine a failing component in the smart flow cytometer. Other sensors may used to determine maintenance issues in advance from the monitoring process so that maintenance can be performed and bring a smart flow cytometer back into operational condition.

The quality control (QC) system 270 of the smart flow cytometer 200 includes a quality control bead reservoir 230 and a quality controller sampler controller 235. The quality control bead reservoir 230 includes a plurality of calibration or quality control beads. These are used to calibrate the quality of the output data from the smart flow cytometer 200. U.S. Patent No. 62/674,273 titled FAST RECOMPENSATION OF FLOW CYTOMETERY DATA FOR SPILLOVER READJUSTMENTS filed on May 21, 2018 by Zhenyu Zhang, generally describes the calibration process of a flow cytometer and is incorporated by reference. The quality control sampler controller 235 is coupled to the bead reservoir 230 to receive a plurality of beads and automatically form a sample for testing the operational condition of the smart flow cytometer 200. The sample in a sample test tube is moved from the bead reservoir 230 over to a sample intake of a flow tube coupled to the flow cell of the fluidic system 208. In this manner, the QC beads from the beads reservoir 230 can be run through the flow cytometer like a normal sample of cells. The movement from the beads reservoir 230 to the flow cell in the fluidic system can be performed by a robotic arm (not shown). The QC system 270 can be remotely controlled by the monitoring system 260 to diagnose the smart flow cytometer 200 in the event of a warning or alarm condition.

The monitoring system 260 of the smart flow cytometer 200 includes a microcontroller (MC) 240 and optionally, a network interface/web browser 241 coupled in communication with the microcontroller 240 via a parallel digital interface 247 or an I2C serial interface 250. The network interface/web browser 241 can have a firewall and encrypted web pages with login ID and password to grant access to a service provider. A cable connector (e.g., RJ45 Ethernet connector) can be coupled in communication with the network interface/web browser 241 to receive a wired cable to connect to a local area network or a wide area network. Alternatively, the NIC may include a radio transceiver to wirelessly connect to the network.

The microcontroller 240, for example, can be a SILICON LABS C8051F311 microcontroller or an ATMEL MEGA8L microcontroller. The microcontroller 240 can include an internal EEPROM 240 (or alternatively an external non-volatile memory or storage device, such as memory 222) to store monitor data that periodically captures the operational conditions of the smart flow cytometer 200 from one or more sensors or one or more components, such as lasers or detectors.

During the startup validation or qualification process with the QC beads, signals from the one or more detectors 218 are converted by the one or more A/D converters 219 into digital data with substantially all of the data being stored into the storage memory or storage device 222 as monitor data. During operation of the flow cytometer running sample cells, the digital data from the one or more A/D converters 219 in the receiver system is periodically sampled and stored into the storage memory or storage device 222 as monitor data. In this manner, the detectors can be constantly monitored in a periodic fashion without having to store substantial amounts of data. During operation of the flow cytometer running sample cells, all of the digital data results output by the one or more A/D converters 219 in the receiver system are coupled into the local host computer for analysis in the normal manner. The monitor data stored in the storage device 222 can be read into the microcontroller 240 through a digital interface 247 and address, data, and control signal lines between the microcontroller 240 and the storage device. The monitor data, representing a parameter history for various operational parameters of the smart flow cytometer, can be stored in the internal memory 242 in a non-volatile manner and subsequently uploaded into a database of a central repair server as explained herein.

Besides a processor and memory, the microcontroller 240 includes a number of interfaces. The microcontroller 240 can include digital signal interfaces, such as an i-squared-c (I²C) serial digital signal interface 250 and/or parallel digital signal interfaces 247 to couple to elements of the flow cytometer, such as the data memory 222 in the electronic system 220, such as an external analog to digital converter 245 in communication with the lasers 204 and/or detectors 218 and/or sensors (e.g., flow rate sensor 210 or pressure sensor 211), and/or the browser 241. The microcontroller 240 can optionally include one or more internal analog to digital converters 245' with analog input signal interfaces to convert an input analog signal into an internal digital signal. In this case, analog signal lines from the lasers 204, detectors 218, or sensors may be directly coupled into the microcontroller 240.

The network interface controller/web browser 241 allows remote internet or cloud based access to the smart flow cytometer 200 for remote operation, diagnostics, and maintenance. An Ethernet cable can be coupled to a wired connector of the network interface controller/web browser 241 to connect the smart flow cytometer to the internet. In another case, the network interface controller/web browser 241 may include a radio transmitter-receiver (transceiver) to wirelessly connect the smart flow cytometer 200 to the internet.

As part of the monitoring system 260, the microcontroller (MC) 240 monitors various parameters in the operation of the smart flow cytometer 200 on a constant periodic basis, even when the flow cytometer is not being used to analyze samples of cells. Consider that laser failure is one of the most common failures in a flow cytometer. Typically, the laser does not fail suddenly, but slowly over a period of days and time. The microcontroller (MC) 240 constantly monitors various parameters of the one or more lasers 204, such as laser power, laser driver current, and laser bias voltage, on a periodic basis. A laser failure can take quite some time and be expensive to repair/replace and can be an expensive part.

A flow cytometer may use a plurality of detectors to capture various wavelengths of light. The quantity of detectors can increase the probability of flow cytometer failure. Systems often need disassembly to gain access to a failing component in a flow cytometer. When one fails, it would be desirable to know if they all of the plurality of detectors should be replaced. Accordingly, on a periodic basis, the microcontroller 240 constantly monitors various parameters of the one or more detectors 218, such as leakage current, and compares that to the predetermined limits to determine the conditions of all of the one or more detectors 218.

A flow cytometer has a number of optical components that are a part of the laser system and the receiver system. These elements may experience misalignment due to vibrations or physical jarring of the flow cytometer. In which case, the effectiveness and quality of data captured by the laser system and/or the receiver system may be diminished. Oftentimes, alignment of elements can be corrected on a regular maintenance basis. However, it can be helpful to determine if elements are so far out of alignment that the captured data is useless. Accordingly, on a periodic basis, the microcontroller 240 can periodically cause a validation/calibration of the flow cytometer and constantly monitor the captured data of the one or more detectors 218 for degradation and compare the data to predetermined limits to determine the condition of the laser, the optical elements, and the detectors in the laser system and the receiver system.

The fluidic system 208 of the smart flow cytometer 200 usually undergoes some basic daily maintenance performed by the user for some elements. A smart flow cytometer can alert a user to the need for daily maintenance or an earlier maintenance requirement, such as fluid levels for example. On a periodic basis, the microcontroller 240 can constantly monitor fluid levels in tanks of the fluidic system with level sensors to detect when to refill a fluid before a tank is completely empty or to detect when to empty a tank before it becomes completely filled with a waste fluid. Also, some components in the fluidic system may start to fail such as a valve and be unknown to the user. In other cases, a clog may gradually occur unbeknownst to the user. Tubes can become gradually clogged thereby slowing the flow rate of fluids, possibly increasing pressure behind the clog, and possibly lowering pressure after the clog, before being completely blocked. On a periodic basis, the microcontroller 240 constantly monitors various parameters of the fluidic system, such as flow rates measured by one or more flow rate sensors, to detect possible valve failure early, or to detect clogs that are starting before complete blockages occur.

A number of values from the laser, detector, or other sensors may be analog values that are not conducive to data storage. For example, laser power, laser driver current, laser bias voltage, and leakage current are typically analog values from the one or more lasers. To periodically store values of these parameters during operation of the flow cytometer, the analog values of the operational parameters of the flow cytometer are digitized by analog to digital converters (ADC), such as the external analog to digital converter 245,219 or the internal analog to digital converter 245'. After digitizing the values of the parameters of the one or more lasers, the microcontroller (MC) 240 can store the digital values in a non-volatile manner its internal memory 242 and/or an external memory 222 or other storage device of the electronic system 220. The microcontroller (MC) 240 can also use its internal memory 242 and/or the external memory 222 of the electronic system 220 to store data representing flag bits that can be set/cleared or data representing limits to which the values of parameters can be stored. A memory map stored in a known location in the internal memory 242 can be used to logically map where the data, bit flags, and limits are stored. Alternatively, the microcontroller (MC) 240 can also include registers of flip flop storage locations that can store bits representing flags that be set and cleared. Alternatively, the microcontroller (MC) 240 can also include registers of a plurality storage locations that can be used to store data representing limit values.

The microcontroller 240 includes logic (e.g., arithmetic logic unit) that can perform various mathematical functions, including comparing two numbers to decide which is greater. Accordingly, the logic of the microcontroller 240 can compare the digitized values of the operational parameters of the flow cytometer with pre-determined limits of the values. The pre-determined limits can be stored in a non-volatile manner in the internal memory 242 of the micro-controller and/or the memory 222 of the electronic system 220. The pre-determined limits may be alarm limits that generate alarm flags indicating failure has occurred or is imminent to occur because an operational maximum or minimum was exceeded. The pre-determined limits may be warning limits set before reaching operational maximums or minimums and generate a warning flag before an alarm flag is generated. A warning flag can be used by the monitoring system to schedule maintenance in advance of a failure. An alarm warning flag, indicating actual failure or imminent failure, can be used by the monitoring system to require immediate repair of the smart flow cytometer 200. For example, a warning flag for a laser 204 can schedule maintenance in the near future to replace the laser before it fails. An alarm flag for a laser 204 can indicate failure such that the laser 204 must be immediately replace for smart flow cytometer to be functional again.

To facilitate monitoring of the detectors 218 and lasers 204, the smart flow cytometer 200 has two operation modes, a normal operation mode and a power down mode. In power down mode, lasers and photodiodes will be periodically powered on a fixed schedule to examine the conditions of the flow cytometer. In normal operation when the lasers and detectors are powered to run a sample of cells or QC beads through the fluidic system, laser and photodiode operational conditions are provided continuously and can be periodically sampled as parameters. The sampled parameters can be directly recorded into the EEPROM memory 242 of the microcontroller 240 in the case of the lasers 204, or initially stored in the storage device 222 in the case of the detectors and other sensors and subsequently read into the EEPROM memory 242. The parameter data when captured is time and date stamped to provide a history of the various operational parameters of the smart flow cytometer.

To facilitate quality assurance of the operation of the flow cytometer, the smart flow cytometer has a calibration/qualification/validation mode as well. In order to pre-warm and preset the operation of the smart flow cytometer 200 before a user's scheduled operation time, the smart flow cytometer 200 utilizes the quality control system 270. Knowing the user's scheduled operation time, the microcontroller 240 can automatically start up a calibration/qualification operation prior to the user's scheduled time.

The quality control system 270 of the smart flow cytometer 200 has the QC bead reservoir 230 that stores qualification, validation, or calibration beads (QC beads) that can be placed into a plurality of test tubes to form sample test tubes. The calibration beads may be CYTEK QBSURE beads that work well with CYTEK's QBSURE quality control software. The QC sampler 235 includes a robot arm can transport a sample test tube (QC test sample) with the QC beads from the reservoir 230 to the desired location of the fluidic system 208 to run a qualification/calibration/validation/quality control test. The qualification data captured by the detectors when running the QC sample is stored in a non-volatile manner in the internal memory 242 of the micro-controller 240 and/or the memory 222 of the electronic system 220. The qualification data can be used to diagnose the operation and accuracy of the flow cytometer and make adjustments to the resultant data to obtain more accurate results. Predetermined limits for the qualification data can be set and stored into the internal memory 242 of the micro-controller 240 and/or the memory 222 of the electronic system 220. The stored measured qualification data can be compared to the predetermined alarm QC limits and warning QC limits by the microcontroller to generate QC alarm flags and QC warning flags respectively if the measured QC data is above a maximum limit or below a minimum limit.

Micro-controller 240 is set in a slave mode to communicate with the external host through serial two-wire interface, such as an IEEE I2C interface 250 through serial data/address line SDA 252 and the serial control line SCL 254. This allows flow cytometer manufacture to offer centralized monitoring service through internet and provide real time and preemptive maintenance service programs to help reduce the instrument downtime, fully recognize the value of the flow cytometers.

Figure 3:
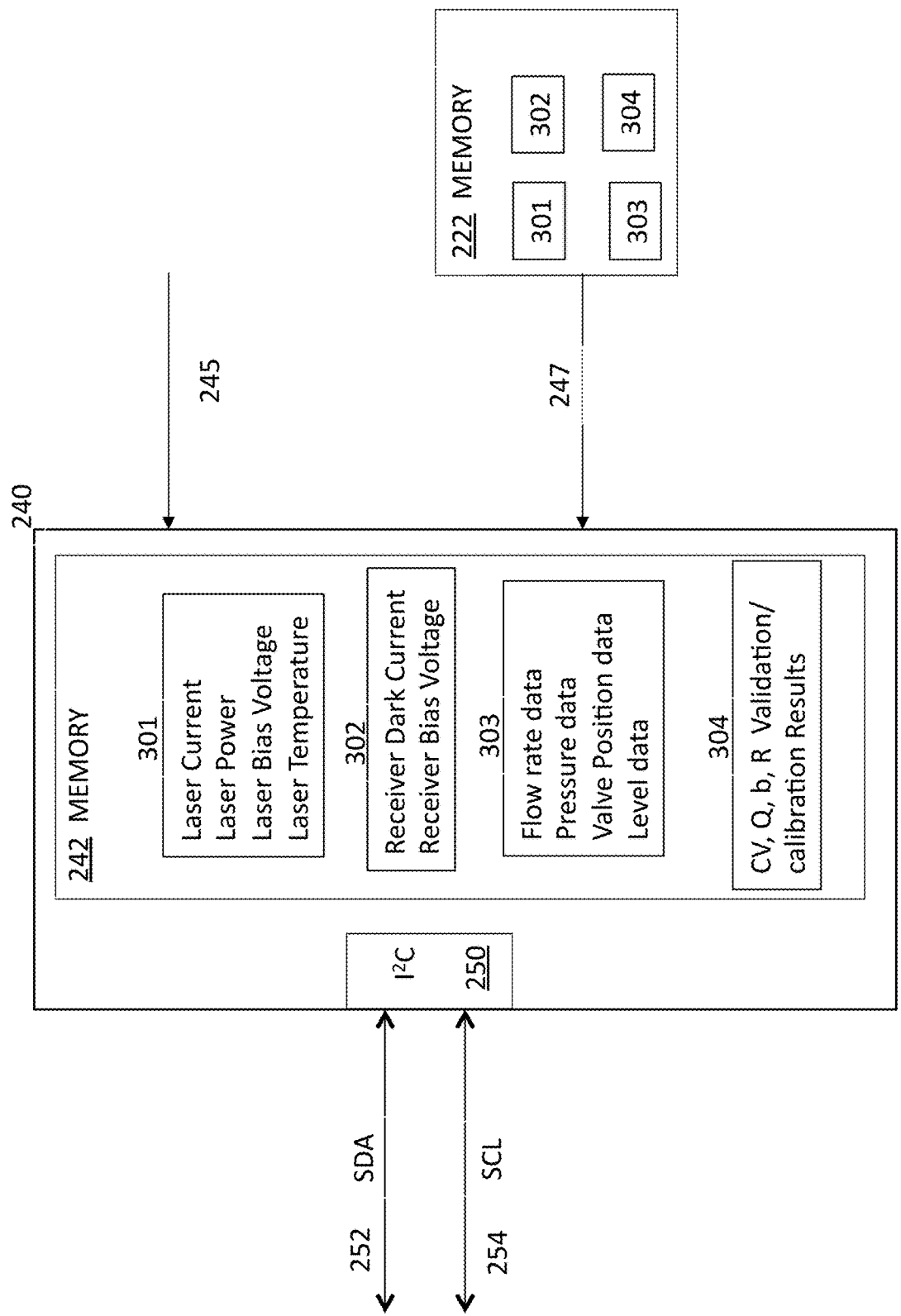
FIG. 3 is a block diagram of a micro-controller that illustrates exemplary parameters of the smart flow cytometer that are to be monitored and stored in memory.

Referring now to FIGS. 2 and 3, the microcontroller 240 in conjunction with the electronic system 220, monitors various parameters in the flow cytometer from its various systems. For the laser system 202, laser related parameters 301 are monitored. For the receiver system 214, detector related parameters 302 are monitored. For the fluidic system 208, fluid related parameters 303 are monitored. For the quality control/qualification system 270, quality control related parameters 304 are monitored. These monitored parameters are date and time stamped. The stamped monitored parameters may then be stored in an internal storage device 242 by the microcontroller 240 and/or an external storage device 222, such as a writeable non-volatile memory. The parameter data may be compressed (e.g., lossless) to save storage space in the internal storage device 242 and/or the external storage device 222. Furthermore, a window of date and time may be kept depending on storage space, (e.g., 3 months of use, 1 year of use) to see the historical trend of a parameter. Representative values for each day, week, month, and/or year may be stored while duplicative values are discarded (e.g., lossy compression) to conserve space and maintain history of operation and see trend lines.

For the one or more lasers 204 in the laser system 202 of the flow cytometer 200, the microcontroller 240 monitors input laser current, output laser power, input laser bias voltage, and laser temperature over date and time (date-time) for each laser. One or more of these operational conditions of the lasers 204 are analog parameters that need conversion into digital parameters by an ADC 245,245' for storage by the memory 242 of the microcontroller 240. The stored parameter history over date-time can be used to predict failure of the lasers 204, set warning/alarm flags, and send out warning/alarm messages.

If the input laser current into a laser is increasing over date-time, it can provide an indication of possible failure. If there is zero input laser current into a laser, it can provide an indication of an open circuit and failed laser. If the output laser power of the laser is increasing over date-time, it can somewhat provide an indication of possible failure similar to an increasing laser input current. If there is zero laser power output from the laser, it can provide an indication of an open circuit and failed laser. If the laser bias voltage across the laser terminals decreases to near zero, it can provide an indication that the laser is shorting out and failed upon complete short. Alternatively, it may be an indication that the power supply to the laser to provide the bias voltage is failing. The laser temperature of the laser is desirable to keep within an operational range. If the laser temperature is increasing over date-time, it can provide an indication of possible failure similar to an increasing laser input current. If the laser temperature goes below a lower limit, it can indicate a failure in the laser to bias into an operating condition or in a system that keeps the laser biased.

For the one or more detectors 218 (e.g., photodiodes or photomultiplier tubes) in the receiver system 214, the microcontroller 240 monitors receiver dark current (noise output current when no light is received) and receiver bias voltage across the photodiode terminals over date-time. Like the data output from the photo detectors 218, this parameter information that is monitored can be periodically sampled by one of the ADC 219 and stored by the external storage device 222 or directly stored into the memory 242 of the microcontroller 240. The stored parameter history over date-time can be used to predict failure of the detectors 218, set warning/alarm flags, and send out warning/alarm messages.

When the dark current of a photodiode increases over date-time, it can provide an indication of possible failure of the detector. If the receiver bias voltage across the photodiode terminals decreases to near zero, it can provide an indication that the photodiode is shorted out and failed. Alternatively, it may be an indication that the power supply to the photodiode to provide the bias voltage is failing.

The fluidic system 208 of the flow cytometer 200 can include one or more flow rate sensors 210, one or more flow valves with valve position sensors 212, one or more level sensors 213, and one or more pressure/vacuum sensors 211. For the one or more flow rate sensors 210, the microcontroller 240 monitors the flow rate data to capture flow rate data over date-time. For the one or more flow pressure/vacuum sensors 211, the microcontroller 240 monitors the pressure data over date-time. For the one or more flow valves 212, the microcontroller 240 monitors the valve position data over date-time. For the one or more level sensors 213, the microcontroller 240 monitors the level data over date-time. For the quality control system of the flow cytometer 200, the quality control/qualification/calibration data/information, including coefficient of variation (CV) data, from each qualification test of the quality control sample 235 is monitored over date-time by the microcontroller 240. All of these values that are desirous to be monitored may be initially captured by a memory 222 in the electronic system 220 as monitor data or directly by the memory 242 in the microcontroller 240. Some or all of the monitor data stored in the memory 222 can be periodically transferred into memory locations in the memory 242 of the microcontroller 240.

When a flow rate measured by one or more flow rate sensor decreases, it can indicate a clogging system, a failing valve to open to maintain fluid flow, or a failing pump to maintain fluid pressure so the fluid can flow. A decreasing positive pressure measured over date-time measured by a pressure sensor can indicate a failing valve to open to maintain fluid flow, or a failing pump to maintain fluid pressure so the fluid can flow. An increasing pressure (vacuum) measured over date-time by a pressure sensor measuring a vacuum can indicate a failing valve to open and maintain vacuum, or a failing vacuum pump to maintain the near zero pressure.

For validation or qualification of the flow cytometer, the QC beads in a QC sample are run through the flow cytometer and the data results are monitored by the flow cytometer for quality control. All of the data that is detected by the detectors during a validation or qualification run is substantially stored in the memory of the flow cytometer or the memory of the microcontroller so it can be analyzed. After the sample run is completed, the data output results from the detectors are statistically analyzed generally for intensity (center of distribution-mean, median of peak channel), and spread (standard deviation or coefficient of variation of a channel) of the distribution of points. The QC beads of CYTEK BIOSCIENCE referred to as QBSURE beads, have their own program to generate values of detector or light collection efficiency Q, optical or background noise b, and resolution limit R for detecting dim populations for each dye parameter marked on the QC beads in the QC sample for the given flow cytometer configuration (e.g., #detectors, Masers, and wavelengths thereof).

The light collection efficiency Q can be measured by counting the number of photo-electrons captured by the detector divided by the number of Molecules (beads) of fluorescence in the QC sample. It has units of photo electrons/Molecule of fluorescence (MEFL). If the coefficient of variation (CV) is measured, the light collection efficiency Q can be computed by the equation:

$$1/\text{MEFL} \times \text{CV}^2$$

The background noise b parameter can be measure by counting the number of Molecule of fluorescence (MEFL) when running the QC beads without laser light. It can be calculated by an equation of the square of the ratio of standard deviation without laser light ($SD_{blank}$) to standard deviation with modulated laser light ($SD_{Modbright}$) multiplied by the Molecule of fluorescence (MEFL) when running the QC beads with laser light by the equation:

$$b = (SD_{blank}/SD_{Mod\ bright})^2 \times \text{MEFL}$$

The resolution limit R is the lowest value where the cytometer can resolve a particle of interest from the background noise b. It has units of Molecule of fluorescence (MEFL). It can be calculated by solving an equation of equality for the variable f when both Q and b are known. The equation of equality is:

$$2\times\sqrt{Qb} = Qf - 2\sqrt{(Q \times f)} + b$$

The data output results from the detectors for the QC sample are also analyzed for coefficient of variation (CV) or spread of distribution for each detection channel. The coefficient of variation (CV) provides a measure of laser alignment. With known QC beads in the QC samples, an expected range of values for Q, b, R, and CV around a target operating condition can be set for warning limits and alarm limits. A failing result for any of the Q, b, R, and/or CV values of a given dye/detector that are outside a desired range, can indicate a failing laser, a failing detector, or an optical misalignment of one or more optical elements, laser, or detector of the smart flow cytometer. A laser may be misaligned with the sample region of a flow tube. A detector may be misaligned with an optical elements (e.g., a lens, filter, or mirror). The misalignment of a laser, a detector, or an optical element can reduce the quality of the capture of light and the generation of the Q, b, R, and CV values so much so that a range of limits around target values is exceeded. When a value is outside the high/low warning limits and/or the high/low alarm limits that are set, flags can be set, messages can be sent and a maintenance or repair to perform a realignment can be scheduled for the failing flow cytometer.

The resolution limit R parameter quantifies the number of dye molecules needed to resolve a dim population from the background noise b. Lower R values indicate better performance by the smart flow cytometer. Accordingly, if the trend of the R value in the stored QC history for a detector in a detection channel is increasing, it can provide an indication of repair or maintenance being needed for the flow cytometer. Lower optical background noise b is typically better. If the trend of the optical background noise b parameter in the stored QC history for a detector in a detection channel is increasing, it can provide an indication of repair or maintenance being needed for the flow cytometer. Generally, a higher value for detector or light collection efficiency Q parameter for a given detector indicates better performance by the smart flow cytometer. If the trend of the light collection efficiency Q parameter in the stored QC history for a detector in a detection channel is decreasing, it can provide an indication of repair or maintenance being needed for the flow cytometer. Generally, a lower value of coefficient of variation (CV) indicates better laser alignment. If the trend of the coefficient of variation (CV) parameter in the stored QC history for a detector in a detection channel is increasing indicating a misalignment condition, it can provide an indication of repair or maintenance being needed for the flow cytometer. The light collection efficiency Q, background noise b, resolution limit R, and coefficient of variation CV are all monitored by the monitoring system and can be stamped with date-time so that a history of these quality control QC parameters can be kept.

Otherwise, without a history, a validation process can be automatically run once or twice per day at a scheduled time (e.g., every morning at 6 am before user arrives at the laboratory) by the microcontroller using the beads from the QC reservoir. Each morning values for the quality control QC parameters (light collection efficiency Q, background noise b, resolution limit R, and coefficient of variation CV) can be compared against respective high/low warning limits and respective high/low alarm limits establishing ranges to set up a maintenance or repair of the given smart flow cytometer when outside the warning range and/or the alarm range. A flag bit can be set and a message sent to the server requesting maintenance/repair of the failing smart flow cytometer. The validation process can be run before each run of sample cells as well.

The one or more lasers 204 can provide values of the monitoring parameters in analog form for digitization and then storage into memory or other storage device so that the parameters can be compared with the predetermine limits by the microcontroller 240. Similarly, the one or more detectors and one or more sensors can provide values of monitoring parameters in analog form for digitization and then storage into memory or other storage device so that the parameters can be compared with the predetermine limits by the microcontroller 240. In some cases, the lasers, detectors, or other sensors may have the capability of providing one or more parameters directly in digital form such that the digitization by an analog to digital converter is unnecessary.

Figure 4:
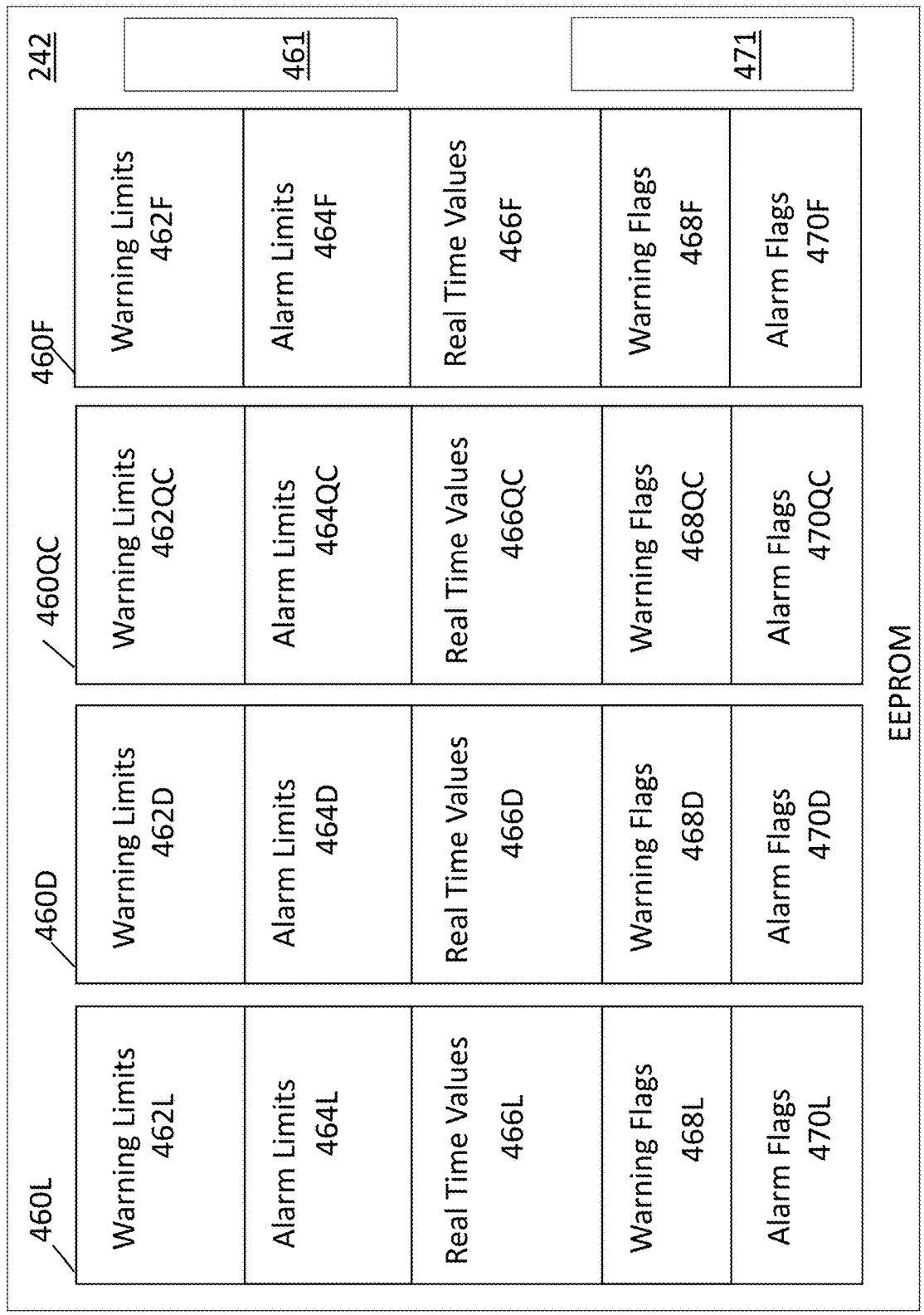
FIG. 4 is a block diagram of memory with memory maps storing pointers into memory where limits, flags, and parameter data marked with date-time are stored.

Referring now to FIG. 4, a block diagram of the microcontroller electrically erasable programmable read only memory (EEPROM) 242 is shown. The EEPROM 242 stores one or more tables 460L, 460D, 460QC, 460F (collectively referred to as tables 460) that are predefined memory maps to memory locations in non-volatile memory (e.g., internal registers, internal memory (e.g., EEPROM 242), external memory, or other storage devices) regarding the operational limits and real time measured values of the operation of a flow cytometer. The stored data pointed out by the memory maps to the memory/storage locations allows for remote real time diagnosis of a flow cytometer. The stored data can allow effective interaction between service providers and the users of a smart flow cytometer. The tables 460 can be accessed, locally by a local host computer or remotely by a remote client computer via a web interface, to read values pointed to by the memory map in order to monitor the operational condition of the smart flow cytometer and to provide maintenance services based on the operational conditions.

For the one or more lasers 204 in the flow cytometer 200, the laser table 460L stores pointers (e.g., addresses into memory) to warning limits 462L, pointers to alarm limits 464L, pointers to real time monitored values 466L, pointers to warning flags 468L, and pointers to alarm flags 470L stored in one or more memories or other storage devices. The real time monitored values 466L are the constant periodic samples of operational parameters associated with the operation of the flow cytometer that are stamped with date and time. The real time monitored values 466L form a parameter history for the smart flow cytometer that can be analyzed to see trends of failure modes and generate warnings and/or alarms when compared with the respective predetermined warning and alarm limits that can be set by the manufacturer or the user. The goal of the monitoring and the alarm/warning limits is to repair a failing or weak component in the smart flow cytometer before the date and time the next user is scheduled to use the smart flow cytometer. The goal of the warning limits is to provide a number of days in advance (advance warning days) before probable component failure, while still allowing operation/ usage of the smart flow cytometer. The goal of alarm limits, typically surpassed or exceeded after a warning limit is exceeded or surpassed, is to provide notice that a component is likely to fail at any moment, if usage of the smart flow cytometer is continued, and that a component needs to be immediately replaced or a system needs immediate maintenance to properly function.

The flow cytometer operational parameters may have low alarm/warning limits and high alarm/warning limits, setting up an operational range around a target operation condition. Accordingly, there may be high/low warning limits and high/low alarm limits set that fall outside the target operation condition. For example, if a target operational condition is X the warning limits may be set at +/−5% outside the target operation condition X, and alarm limits may be set at +/−10% outside the target operation condition X. The alarm limits are set beyond the warning limits so the parameter is further way from the target operation condition X. Consider for example, target conditions for a laser having laser power set in the factory to operate at 100 milliwatts (mW) at 300 milliamps (mA) with an operation current at 30 degrees centigrade (C). The operation power High/Low Warning power can be set to 105/95 mW. The High/Low Alarm power can be set to 110 mW/90 mW which is further outside the range of 105/95 mW. The High/Low Warning current can be set to 315/285 mA. The High/Low Alarm current can be set to 330/270 mA which is further outside the range of 315/285 mA. The High/Low Warning temperature can be set to 31.5/28.5 C. The High/Low Alarm temperature can be set to 33/27 C which is further outside the range of 31.5/28.5 C.

Figures 5A, 5B:
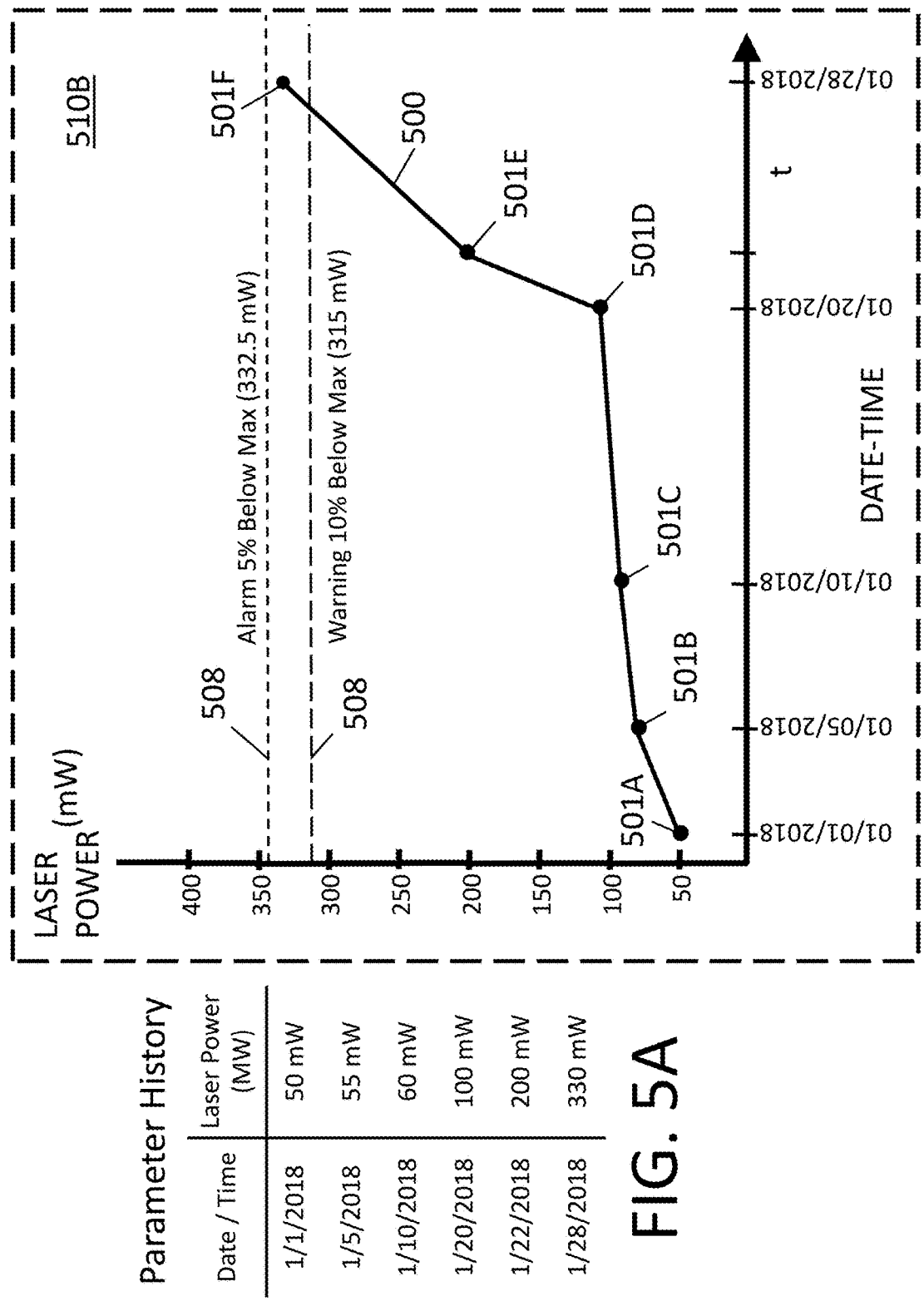
FIG. 5A is a parameter history for an exemplary parameter (laser power) for periodic operation (date-time) of a smart flow cytometer.
FIG. 5B is a chart of an exemplary parameter (laser power) versus periodic operation (date-time) plotting the parameter history of FIG. 5A for operation of the smart flow cytometer and exemplary alarm and warning limits based on a maximum component parameter.
Figure 5C:
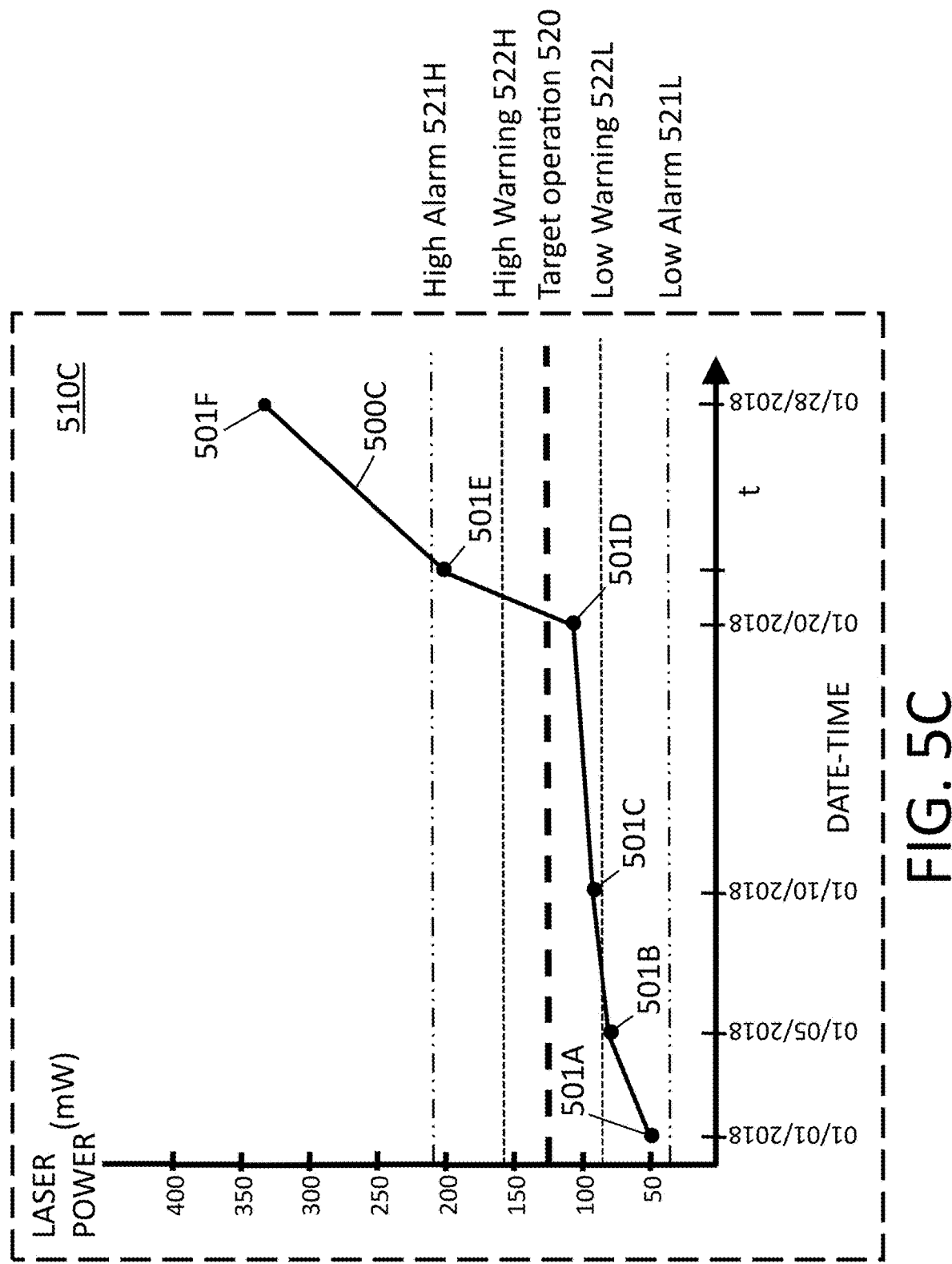
FIG. 5C is a chart of an exemplary parameter (laser power) versus periodic operation (date-time) plotting the parameter history of FIG. 5A for operation of the smart flow cytometer and exemplary high/low alarm limits and high/low warning limits based on a target operational parameter condition.

FIG. 5C illustrates a user interface 510C displaying an example plotted curve 500C of laser power with a target operation condition 520 for laser power around 125 mw. A high warning limit 522H and a low warning limit 522L bound a range around the target operation condition 520. A high alarm limit 521H and a low alarm limit 521L bound a larger range around the target operation condition 520 that is outside the range set by the warning limits. When the parameter value just exceeds the range set by the warning limits but still within the alarm range set by the alarm limits, a warning flag is set and a warning message is sent out from the flow cytometer to alert the manufacture, service provider, and user about the warning limit being exceeded. Points 501A-501B of the curve 500C illustrate a condition for a parameter value where a warning may be sent for exceeding a low warning limit 522L but not the low alarm limit 521L. Point 501E of the curve 500C illustrates a condition for a parameter value where a warning message may be sent for exceeding a high warning limit 522H but not the high alarm limit 521H. When the parameter value exceeds both the range set by the warning limits and the range set by the alarm limits, an alarm flag is set and an alarm message can be sent out from the flow cytometer to alert the manufacture, service provider, and user about the alarm limit being exceeded. Point 501F on the curve 500C illustrates a condition for a parameter value where an alarm message may be sent for exceeding a high alarm limit 521H.

Other limits can be set for flags of warnings/alarms depending on the flow cytometer, the system, and/or component operational requirements. For example, specified maximum limits of a component may be used to set the high warning limits and high alarm limits. The high warning limits may be set within X % of the maximum limit such as 10%. The high alarm limits may be set within Y % of the maximum limit that is less than X %, such as within 5% of the maximum limit. Similarly, a specified minimum limit of a component may be used to set low warning limits and low alarm limits, if any. The low warning limits may be set within X % of the minimum limit such as 10%. The low alarm limits may be set within Y % of the minimum limit that is less than X %, such as within 5% of the minimum limit. FIGS. 5A-5B and the description thereof provide an example of setting high alarm and high warning limits based on a maximum limit of a component.

The real time monitored values of the laser power, laser current, and laser temperatures for the one or more lasers represent some of the operation conditions of the flow cytometer. The real time monitored values are compared with the predetermined laser warning limits 462L and the predetermined laser alarm limits 464L. If any violation of a warning limit occurs, laser warning flags 468L are set in the memory map. If any violation of an alarm limit occurs, laser alarm flags 470L are set in the memory map.

A similar set of limits and flags can be similarly monitored for the detectors 218 in the system. The real time monitored values of dark current, and receiver bias voltage for the one or more detectors, represent additional operation conditions of the flow cytometer. For the one or more detectors 218 in the flow cytometer 200, the detector table 460D stores pointers (e.g., addresses into memory) to warning limits 462D, pointers to alarm limits 464D, pointers to real time monitored values 466D, pointers to warning flags 468D, and pointers to alarm flags 470D. The warning limits may be set at +/−5% of the target operation condition of the detectors, and alarm limits may be set at +/−10% of the target operation condition of the detectors. Alternatively, a maximum value for the detector may be used to set limits. For example, consider an avalanche photodiode as a detector having an operational range of dark current from 0.5 Nano Amperes to 5 Nano Amperes. A high warning limit may be set at 4 Nano Amperes. A high alarm limit may be set at the maximum of the range, 5 Nano Amperes.

The real time monitored values are compared with the predetermined detector warning limits 462D and the predetermined detector alarm limits 464D. If any violation of a warning limit occurs, detector warning flags 468D are set in the memory map. If any violation of an alarm limit occurs, detector alarm flags 470D are set in the memory map. Other limits can be set for flags and alarms depending on the instrument operation requirements.

In operation, the smart flow cytometer 200 can generate raw output data related to beads, particles, or cells in a sample, based on the light (e.g., fluorescent and/or scattered) that is captured by the detectors. Because fluorescent light is usually captured and used to analyze the beads, particles, or cells, the raw output data may also be referred to as raw fluorescent output data.

A similar set of limits and flags can be similarly monitored for the quality control (QC) behavior during calibration/qualification operations of the flow cytometer with calibration or quality control beads, such as QBSURE quality control beads for example. For the overall quality control of raw output data from the flow cytometer 200 generated by the receiver system, with help of the fluidic system, the laser system, and the electronic control system, the quality control (QC) table 460QC stores pointers (e.g., addresses into memory) to warning limits 462QC, pointers to alarm limits 464QC, pointers to real time monitored values 466QC, pointers to warning flags 468QC, and pointers to alarm flags 470QC. An example table of target values (target operational quality control conditions) for quality control parameters for several dyes on the different QC beads is:

| Par. | Q | b | Res. Lim |
|---|---|---|---|
| FITC | 0.035 | 394 | 680 |
| PE | 0.219 | 455 | 252 |
| PE-Cy5 | 0.031 | 18 | 287 |
| PE-Cy7 | 0.005 | 54 | 1258 |

| Par. | Q | b | Res. Lim |
|---|---|---|---|
| APC | 0.040 | 15 | 227 |
| APC-Cy7 | 0.009 | 330 | 1391 |

The warning limits for the QC parameters may be set at +/−5% of these target operation quality control conditions of the flow cytometer, and alarm limits may be set at +/−10% of the target operation quality control condition of the flow cytometer. The real time monitored quality control values 466QC are compared with the predetermined quality control warning limits 462QC and the predetermined quality control alarm limits 464QC. If any violation of a warning limit occurs, quality control warning flags 468QC are set in the memory map. If any violation of an alarm limit occurs, quality control alarm flags 470QC are set in the memory map.

The EEPROM is flexible such that other limits can be predetermined and set for flags and alarms (e.g., flow rate sensor) depending on the instrument operation requirements of the smart flow cytometer. A similar set of limits and flags can be similarly monitored for the flow rate behavior of the fluidic system during operation of the flow cytometer. For the one or more flow rate sensors 210, one or more pressure sensors 211, and/or one or more flow valves 212 in the fluidic system of the smart flow cytometer 200, a fluidic sensor table 460F stores pointers (e.g., addresses into memory) to warning limits 462F, pointers to alarm limits 464F, pointers to real time monitored values 466F, pointers to warning flags 468F, and pointers to alarm flags 470F.

The flow rate of one or more flow rate sensors 210 can be stored and monitored for example by comparing it with predetermined warning limits 462F and alarm limits 464F stored in the EEPROM 242. If a predetermined warning limit or alarm limit of flow rate is exceeded a warning flag 468F or alarm flag 470F can be set. High/low predetermined warning limits and high/low predetermined alarm limits may be set based on a target value or range of values for flow rate. For example, a typical target range of flow rate for the sample fluid including cells/beads is 10 micro-liters (ul) per minute to 66 ul per minute. High limits for warning and alarm can be based on the upper value of the range. Low limits for warning and alarm can be based on the lower value of the range. Consider another example, where a target value of flow rate for the sheath fluid around the sample fluid is 11 milliliters (ml) per minute. In this case, high/low predetermined warning limits and high/low predetermined alarm limits may be set based on the target value.

Pressures/vacuum at one or more pressure sensors 211 in the fluidic system may be stored and monitored to determine pressure or vacuum at certain points thereof. If a predetermined warning limit 462F or alarm limit 464F of pressure is exceeded by the measured pressure data in an undesirable direction of change (e.g., below a minimum limit or above a maximum limit), a warning flag 468F or alarm flag 470F can be set.

Valve positions of one or more flow valves in the fluidic system can be encoded and captured by one or more flow valve sensors 212 to obtain a measure of the open or closed position of the flow valves. The encoded valve positions over date and time (date-time) of one or more flow valve sensors 212 in the fluidic system of the smart flow cytometer can be monitored and stored. Predetermined open or closed limits of the encoded valve positions determined by the flow valve sensors of the flow valves can be set to generate a warning and then alarm. The microcontroller can compare the actual valve positions periodically with the predetermined limits to determine if the predetermined limits are exceeded. If a predetermined warning limit 462F or alarm limit 464F of valve position is exceeded, a warning flag 468F or alarm flag 470F can be set.

Fluid levels of one or more tanks in the fluidic system can be sensed by level sensors 213, monitored, and stored over date and time (date-time). Predetermined upper and lower limits of the level positions determined by the level sensors can be set to generate a warning and then an alarm. For example, a waste tank can have upper warning and alarm level limits that are sensed to warn that it needs to be emptied and then an alarm when it cannot receive any more fluids. As another example, a sheath tank of sheath fluid can have a warning level limit and an alarm level limit that are compared with the sensed level to warn when the sheath tank needs additional sheath fluid and if not, an alarm when the sheath fluid level is too low to use the smart flow cytometer 200. The microcontroller can compare the actual levels measured by the level sensors periodically with the predetermined limits to determine if the predetermined limits are exceeded. If a predetermined warning limit 462F or alarm limit 464F of a fluid level is exceeded (e.g., below a predetermined minimum limit, or above a predetermined maximum limit), a warning flag 468F or alarm flag 470F can be set.

Other limits can be set for flags and alarms depending on the instrument operation requirements. The microcontroller can compare the actual valves from the flow cytometer periodically with the predetermined limits to determine if the predetermined limits are exceeded. If any predetermined limit is exceeded by any parameter in the smart flow cytometer, the microcontroller can set warning/alarm flags and cause messages to be sent out, such as warning messages or alarm messages (e.g., SMS text, instant messages, email, telephone call), to the user, the manufacturer, and/or the maintenance person.

A global warning flag 461 or a global alarm flag 471 may be triggered if any alarm 462,464 or warning flag 468,470 is set. The global warning flag 461 and global alarm flag 471 alerts the remote host to perform a diagnosis. A message may be sent to the manufacturer, maintenance person, and/or the user that an alarm and/or warning flag has been set. The flow cytometer identification (e.g., model number, serial number, firmware version, hardware/software version, and internet protocol address), location, and type of alarm/warning can be included in the message. A local and/or remote host computer can be connected in communication with the flow cytometer with the warning/alarm such as by a remote login or a physical connection. A diagnosis routine can be initiated by the host to examine the operational condition of the flow cytometer system, to verify probable or actual pending failures, and automatically contact the manufacturer for service/maintenance in advance or at the time of failure. Besides the use of alarm and warning flags, stored historical data of the parameters over date-time can be used to determine the operational condition of the smart flow cytometer.

Instead of the memory 242, warning flags and alarm flags for each parameter may be associated with flip flop storage devices or a register of a plurality of flip flop storage devices. When the global warning flag 461 and global alarm flag 471 are set and a message sent, the remote host can poll the microcontroller to determine the details of which warning flag and/or alarm flag was set to begin a remote diagnosis. Without any alarm or warning the real time values 466 of parameters can be updated or refreshed over time. Upon a warning or alarm of a value exceeding a warning limit or an alarm limit, the values of the parameters over a plurality of date-times can be fixed/saved in the flow cytometer providing a saved state of the failing system and the failure so that it can be read out and analyzed during a diagnosis. Once the date is polled and saved at a remote host computer or server, the real time values of parameters can be refreshed during the diagnosis. The memory of the microcontroller and flow cytometer may be limited to recording a window of real time values for parameters over a limited date-time. The history of the parameters of a given smart flow cytometer, such as the earlier history, can be pushed out to a server for storing a greater amount of parameter history.

Figure 6:
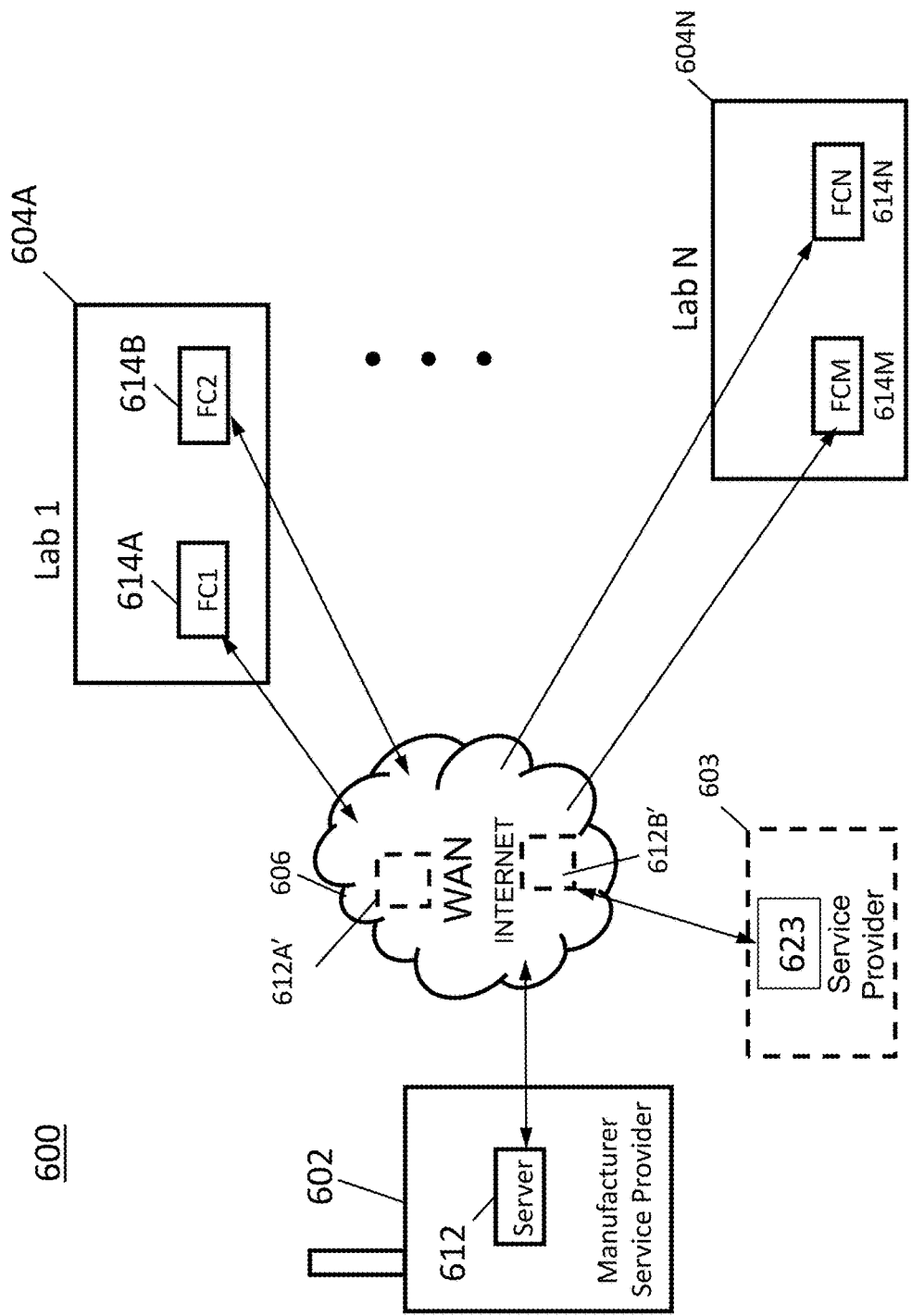
FIG. 6 is a block diagram of a flow cytometer communication network including a flow cytometer repair server in communication with a plurality of smart flow cytometers.

Referring now to FIG. 6, a flow cytometer communication network 600 is shown. The flow cytometer communication network 600 includes a central repair-maintenance server 612, and a plurality of smart flow cytometers FC1-FCN 614A-614N at a plurality of laboratories LAB1-LABN 604A-604N, coupled in communication together by a wide area network (WAN) 606, such as the internet. A functional block diagram of the plurality of smart flow cytometers FC1-FCN 614A-614N is shown in FIG. 2 by the one instance of the smart flow cytometer 200. The central repair-maintenance server 612 can be located and maintained by a manufacturer 602 of the smart flow cytometer. Alternatively, the central repair-maintenance server 612 may be located in one or more data centers in the world. Alternatively, the central repair-maintenance server 612 can be located and maintained by an owner at the owner's site of a large quantity of smart flow cytometers.

The manufacturer 602 of the smart flow cytometers 614A-614N can maintain and repair the flow cytometers with their own employees. In other cases, the manufacturer 602 of the smart flow cytometers 614A-614N can choose to contract out the repair and maintenance services to one or more repair technicians at one or more service providers 603. In other cases, the laboratories may collectively own the smart flow cytometers 614A-614N, can host the central server, and hire their own repair technician to be the service provider 603.

The host computers 623 of the one or more service providers 603 can be selectively placed in communication with one or more of the smart flow cytometers FC1 614, FC2 614B, for example, and the central repair-maintenance server 612. A remote host computer 623 of a service technician can remotely login to the server to see historical parameter data regarding a failing flow cytometer. A remote host computer 623 of a service technician at the service provider can also remotely login to the failing flow cytometer to diagnose the repair/maintenance issue. The service technician can remotely control the failing smart flow cytometer to perform the diagnosis and possibly provide a remote fix of software, if possible, to ameliorate the repair/maintenance issue while setting up a repair/maintenance of the flow cytometer.

The central repair-maintenance server 612 may be physically centrally located at the manufacturer site 602 remote from the laboratories 604A-604N. Alternatively, the central repair-maintenance server 602 may be distributed and located at different servers 612A'-612B' physically located in different data centers around the world for redundancy and load sharing. Typically, the server 612A'-612B' physically located nearest a laboratory 604A-604N may be chosen for an initial communication connection. If a server 612A' goes down, another server 612B' may be chosen for the communication connection with the flow cytometer at the laboratory.

The microcontroller of each flow cytometer can be in communication with the central repair-maintenance server 612,612A'-612B (collectively referred to as server 612) to upload its parameter history into a database and send warning messages and alarm messages when flags are set, due to one or more warning or alarm limits being exceeded. The central repair-maintenance 612 can monitor each of the plurality of flow cytometers FC1-FCN 614A-614N at the plurality of laboratories LAB1-LABN 604A-604N by analyzing the parameter history for each to predict in advance when a failure may occur and schedule repairs and/or maintenance before hand. The parameter history can be pushed by the flow cytometers out to the central server 612. Alternatively, the central server 612 can poll each of the plurality of flow cytometers FC1-FCN 614A-614N for parameter history and any updates to the parameters.

When an alarm message is received by the central repair-maintenance server 612 from a failing flow cytometer, the central repair-maintenance server 612 polls the failing server to determine what alarm/warning flags are set. Based on the specific alarm/warning flags that are set, the server can automatically run one or more diagnostic routines of a plurality of diagnostic routines on the failing flow cytometer to better determine what is about to fail or what has already failed. The diagnosis determined by the server is the basis for automatically scheduling and notifying a repair service/technician with a parts ordering and/or maintenance service. Sometimes, a warning may just be given so that time is provided to take steps before the alarm flag is set. The technician may be able to log in and remotely alleviate the warning condition temporarily with an adjustment to software/firmware. Otherwise, a repair technician may be sent to the laboratory to make repairs and maintenance.

The smart flow cytometer 200 is compact, modular and can be readily moved. Accordingly, if a smart flow cytometer is critically important at a laboratory, the repair technician may take a loaner smart flow cytometer out to the laboratory with the failing or failed smart flow cytometer for temporary exchange to even further minimize downtime while the laboratory's flow cytometer is being repaired. Accordingly, the flow cytometer communication network 600 with the central repair-maintenance server 612 allows the smart flow cytometers in communication therewith to enjoy substantial up-time and avoid significant down time during needed repairs and maintenance to keep them operational.

After repairs or maintenance is undertaken, it may be desirable to start a new history for one or more parameters. Accordingly, the parameter history for one or more parameters can be reset after a repair or maintenance, if so desired.

Referring now FIG. 5A, a parameter history for an exemplary parameter (laser power) for periodic operation (date-time) of the smart flow cytometer is shown. For example, one month of laser power history can be shown in FIG. 5A such as 50 milliwatts (mw) on Jan. 1, 2018; 55 mw on Jan. 5, 2018; 60 mw on Jan. 10, 2018; 100 mw on Jan. 20, 2018; 200 mw on Jan. 22, 2018; and 330 mw on Jan. 28, 2018.

While laser power history is shown in FIG. 5A, histories for other parameters discussed herein can be downloaded from the smart flow cytometer to a local or remote host computer to diagnose the operation of the flow cytometer.

Referring now to FIG. 5B, a chart plots the values of the exemplary parameter (laser power) on the Y axis are over the periodic operation (date-time) on the X axis to show the parameter history in the operation of the smart flow cytometer 200. The chart can be displayed in a user interface window 510 on a display monitor device by a host computer/client in communication with the smart flow cytometer 200. For example, the laser power for a 532 nano-meter (nm) class laser operating in a wavelength range of 0.52 micrometers (um) to 0.55 um can have a maximum laser power of 350 milliwatts (mw). Accordingly, an alarm limit 506 for laser power can be set 5% below maximum at 332.5 mw and a warning limit 508 for laser power can be set at 10% below maximum at 315 mw or at lower levels. In some cases of the parameters, the alarm limit can be set right at the maximum.

Assume the laser operation in the smart flow cytometer has the parameter history shown in FIG. 5A for the month of January 2018 being plotted as points 501A-501F along a curve 500 in a flow cytometer diagnosis user interface window 510. Along the curve 500, the laser appears to operate in a normal manner between points 501A-501D. However, between points 501D-501F, the laser appears to require increasingly more power to operate. So much power is required at point 501F on the curve 500 that a warning limit 508 was passed and so that the microcontroller in the flow cytometer sets a warning flag and a warning message is sent out to user, manufacture, maintenance personal. The warning flag/message can alert maintenance, the user, and the manufacturer that the laser is operating so far out of ordinary that it needs replacing before failure occurs above a maximum limit. This curve 500 shown in the user interface window 510 and others for other parameters can help a technician or maintenance person to diagnose a problem with the smart flow cytometer.

While laser power is plotted in FIGS. 5B-5C in the flow cytometer diagnosis user interface windows 510B-510C, plots for the history of other parameters discussed herein can be plotted for the smart flow cytometer in the user interface windows 510B-510C and displayed on a local or remote display device coupled to a local or remote host computer to diagnose the operation of the flow cytometer.

CONCLUSION

The embodiments of the invention are thus described. While embodiments of the invention have been particularly described, they should not be construed as limited by such embodiments, but rather construed according to the claims that follow below. While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

When implemented in software, the elements of the embodiments of the invention are essentially the code segments to perform the necessary tasks. The program or code segments can be stored in a processor readable storage device, or downloaded from one storage device into the processor readable storage device. Examples of the processor readable storage device include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The code segments may be downloaded via computer networks such as the Internet, Intranet, etc. For example, smart flow cytometer diagnosis software that can diagnose warnings and alarms of a smart flow cytometer can be downloaded into memory or another storage device in the smart flow cytometer for execution by the microcontroller to determine failures of components or systems or possible failures thereof in advance. Smart flow cytometer operational software may be downloaded into memory or another storage device in the smart flow cytometer for execution by the microcontroller to control the operation of validation processes.

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described above as acting in certain combinations and even initially claimed as such, one or more features from a claimed combination may in some cases be excised from the combination, and the claimed combination may be directed to a sub-combination or variations of a sub-combination. Accordingly, the claimed invention is limited only by patented claims that follow below.

What is claimed is:

1. A flow cytometer communication system comprising:
a computer communication network;
a plurality of smart flow cytometers in one or more biological laboratories to analyze biological fluids, the plurality of smart flow cytometers coupled into communication with the computer communication network;
a first central repair server system coupled into communication with the computer communication network and the plurality of smart flow cytometers;
wherein each of the plurality of smart flow cytometers includes a monitoring system configured to monitor a plurality of differing operational parameters of the smart flow cytometer, detect an advanced failure of a plurality of components based on the operational parameters being monitored, and determine an advanced need for repair and maintenance of a smart flow cytometer based on the plurality of differing operational parameters being monitored; and
wherein the monitoring system is configured to
monitor a plurality of differing operational parameters of a laser subsystem and a fluidic subsystem of the smart flow cytometer, and
detect an advanced failure of a plurality of components in the laser subsystem and the fluidic subsystem based on the operational parameters being monitored.

2. The flow cytometer communication system of claim 1, wherein an advanced failure of a component is detected in a failing smart flow cytometer, the failing smart flow cytometer sends a message out from the failing smart flow cytometer to the first central repair server system;
wherein the first central repair server system downloads parameter history associated with the failing component and diagnoses the failure with at least one of a plurality of diagnosis routines that diagnose systems and components of the smart flow cytometer; and wherein the first central repair server system alerts a user, a manufacturer, and/or a repair technician to provide information about the failing smart flow cytometer, an initial diagnosis of the failing component, and schedules a repair service for the failing smart flow cytometer.

3. The flow cytometer communication system of claim 1, further comprising:
a remote host computer at a service provider coupled into communication with the computer communication network and at least one of the plurality of smart flow cytometers;
wherein the first central repair server system receives a warning message from the at least one smart flow cytometer, communicates the warning message to the remote host computer of the service provider, and alerts a repair technician of the service provider to further diagnose the at least one smart flow cytometer and schedule a repair service for the at least one smart flow cytometer before the at least one smart flow cytometer fails.

4. The flow cytometer communication system of claim 1, further comprising:
a remote host computer at a service provider coupled into communication with the computer communication network and at least one of the plurality of smart flow cytometers; and
wherein the first central repair server system receives an alarm message from the at least one smart flow cytometer, communicates the alarm message to the remote host computer of the service provider, and alerts a repair technician of the service provider to further diagnose the at least one smart flow cytometer and immediately provide a repair service for the at least one smart flow cytometer because the at least one smart flow cytometer has failed.

5. The flow cytometer communication system of claim 3, wherein
the warning message is based on a predetermined warning limit for a component being exceeded.

6. The flow cytometer communication system of claim 4, wherein
the alarm message is based on a predetermined warning limit and a predetermined alarm limit for a component being exceeded.

7. A flow cytometer communication system comprising:
a computer communication network;
a plurality of smart flow cytometers in one or more biological laboratories to analyze biological fluids, the plurality of smart flow cytometers coupled into communication with the computer communication network;
a first central repair server system coupled into communication with the computer communication network and the plurality of smart flow cytometers;
wherein each of the plurality of smart flow cytometers includes a monitoring system configured to monitor a plurality of differing operational parameters of the smart flow cytometer, detect an advanced failure of a plurality of components based on the operational parameters being monitored, and determine an advanced need for repair and maintenance of a smart flow cytometer based on the plurality of differing operational parameters being monitored; and
wherein the monitoring system is configured to
monitor a plurality of differing operational parameters of a laser subsystem and a receiver subsystem of the smart flow cytometer, and
detect an advanced failure of a plurality of components in the laser subsystem and the receiver subsystem based on the operational parameters being monitored.

8. The flow cytometer communication system of claim 1, wherein
the monitoring system is further configured to
monitor one or more operational parameters of a receiver subsystem of the smart flow cytometer, and
detect an advanced failure of a component in the receiver subsystem based on the one or more operational parameters being monitored of the receiver subsystem.

9. The flow cytometer communication system of claim 1, wherein
the monitoring system is configured to
monitor a plurality of differing operational parameters of a receiver subsystem of the smart flow cytometer, and
detect an advanced failure of a plurality of components the receiver subsystem based on the operational parameters being monitored.

10. A flow cytometer communication system comprising:
a computer communication network;
a plurality of smart flow cytometers in one or more biological laboratories to analyze biological fluids, the plurality of smart flow cytometers coupled into communication with the computer communication network;
a first central repair server system coupled into communication with the computer communication network and the plurality of smart flow cytometers;
wherein each of the plurality of smart flow cytometers includes a monitoring system configured to monitor a plurality of differing operational parameters of the smart flow cytometer, detect an advanced failure of a plurality of components based on the operational parameters being monitored, and determine an advanced need for repair and maintenance of a smart flow cytometer based on the plurality of differing operational parameters being monitored; and
wherein each of the plurality of smart flow cytometers further includes a quality control system configured to provide start up validation.

11. The flow cytometer communication system of claim 10, wherein
the quality control system is further configured to provide a measure of performance monitoring.

* * * * *